United States Patent
Skowronski

Patent Number: 5,128,993
Date of Patent: Jul. 7, 1992

[54] TELEPHONE DISPENSER WITH COMPACT CORD GUIDE

[75] Inventor: Richard E. Skowronski, Elk Grove Village, Ill.

[73] Assignee: GTE Airfone, Incorporated, Oakbrook, Ill.

[21] Appl. No.: 623,151

[22] Filed: Nov. 28, 1990

[51] Int. Cl.⁵ .................................................. H04M 1/00
[52] U.S. Cl. .................................. 379/438; 379/419; 379/428; 379/434; 379/437
[58] Field of Search .................... 379/56, 58, 144, 419, 379/428, 434, 437, 438, 446

[56] References Cited

U.S. PATENT DOCUMENTS

| | | | |
|---|---|---|---|
| 4,056,696 | 11/1977 | Meyerle et al. | 379/419 |
| 4,169,218 | 9/1979 | Tyler | 379/434 |
| 4,727,569 | 2/1988 | Kutrieb et al. | 379/58 |
| 4,811,387 | 3/1989 | Hollewed et al. | 379/144 |
| 4,868,862 | 9/1989 | Ryoichi et al. | 379/458 |
| 4,881,254 | 11/1989 | Hollewed et al. | 379/144 |
| 4,930,148 | 5/1990 | Lee | 379/58 |
| 4,965,824 | 10/1990 | Hollowed et al. | 379/428 |

FOREIGN PATENT DOCUMENTS

| | | | |
|---|---|---|---|
| 0161963 | 9/1984 | Japan | 379/438 |
| 0100054 | 5/1987 | Japan | 379/438 |

Primary Examiner—James L. Dwyer
Assistant Examiner—William Cumming
Attorney, Agent, or Firm—Dan Hubert

[57] ABSTRACT

An improved telephone handset dispenser stores and dispenses a telephone handset and dispenses the handset upon insertion of an implement such as a credit card. A rectangular front face of a generally box-shaped housing has a longitudinal trough defined therein for receiving the handset. Upon insertion of the implement into a slot defined in the front face of the housing, the handset is dispensed for use. The telephone is electrically attached to the housing by a cord. A rotatably cylindrical cord reel dispenses the cord through the longitudinal trough as the handset is removed; and also stores unused cord. Cord is directed between the cord reel and the longitudinal trough perpendicular to the circumference of the cord reel by a cord guide, thereby permitting the cord reel to be centered in the housing with respect to the longitudinal trough. The housing has two sides and two ends, tapered toward the front face to prevent objects from being placed and retained thereon. Easily removable "punch-out" regions are provided in the housing, thereby permitting a cord from central communications circuitry to be routed into the housing from several directions.

5 Claims, 3 Drawing Sheets

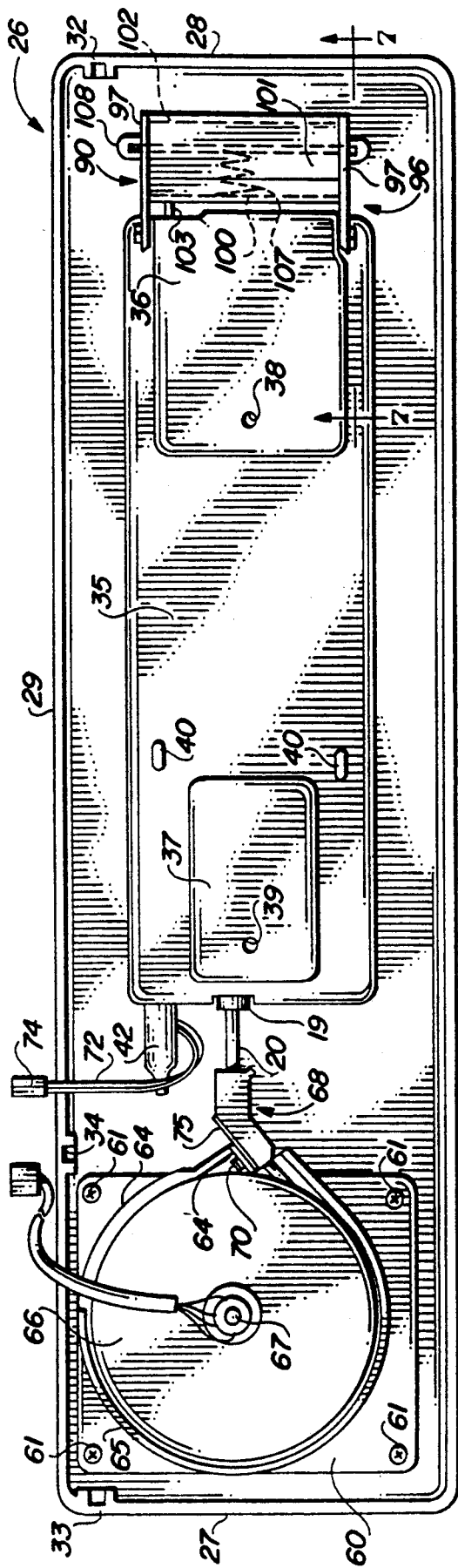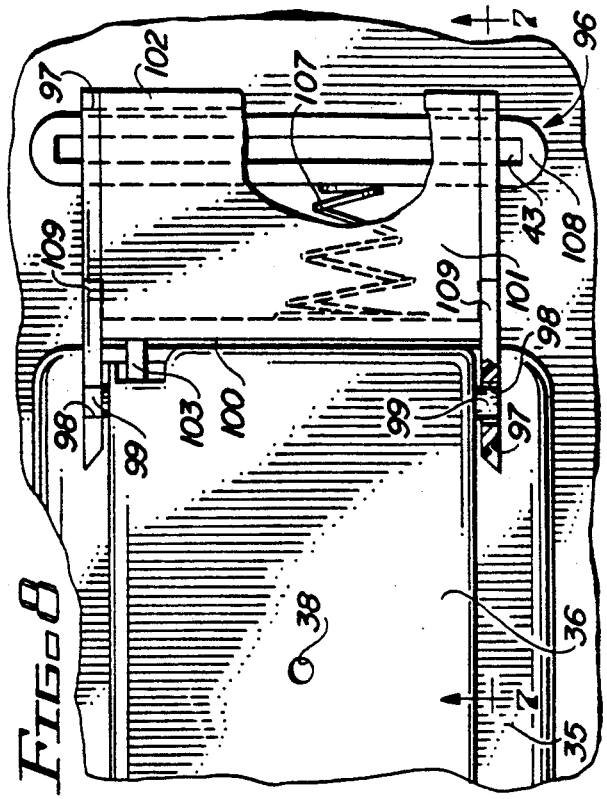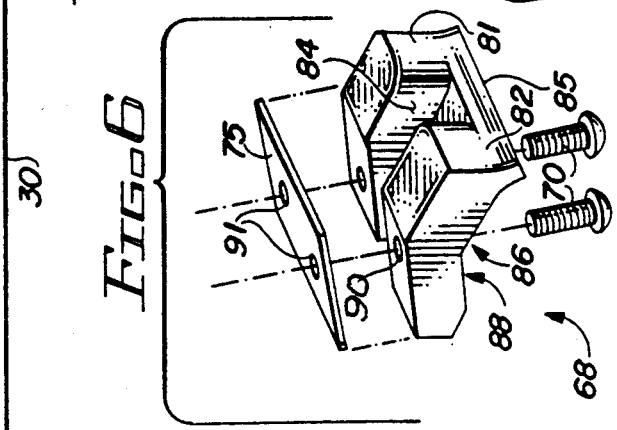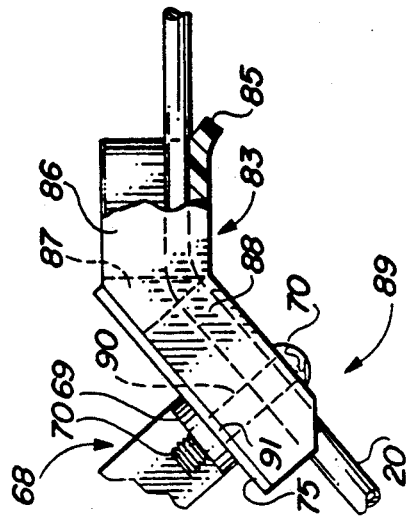

TELEPHONE DISPENSER WITH COMPACT CORD GUIDE

BACKGROUND OF INVENTION

1. Field of the Invention

The present invention relates to public pay telephones and, more particularly, to a telephone handset dispenser for dispensing a telephone handset upon insertion of an implement, such as an ordinary credit card, into an opening in the dispenser.

2. Description of the Related Art

Many types of credit card operated pay telephones are currently known. Furthermore, a number of these telephones have been specifically designed for use by passengers in mass transit applications.

One example of a telephone used in mass transit applications is called the "cabin phone". Typically, a single cabin phone is installed on a wall near the front or the rear of a vehicle such as a commercial aircraft. The cabin phone comprises a cordless telephone handset, a credit card reader, and a housing for the handset and the credit card reader. A passenger initiates a call by placing a credit card into the credit card reader, whereupon the handset is dispensed. The caller may then return to his or her seat and place a call using the handset. After completion of the call, the caller returns the handset to the cabin phone whereupon the credit card reader releases the credit card so that the caller can retrieve it.

The cabin phone has a number of limitations. First, electromagnetic noise from electrical equipment aboard the airplane often interferes with reception of the cabin phone handset because of its cordless design. Therefore, telephone pay stations that are free from electrical interference are needed for use by passengers in mass transit applications.

Another limitation of the cabin phone when considered for use aboard commercial aircraft is that space constraints aboard commercial aircraft usually preclude installation of more than two of the cabin phones. As a result, only two passengers at a time can place calls. Furthermore, each caller must leave his or her seat in order to use the cabin phone. Therefore, telephone pay stations are needed to enable several passengers to place calls simultaneously without leaving their seats.

Another class of pay telephones intended for use by passengers in mass transit applications is a "seat-mounted" phone. The seat-mounted phone is used in a system that includes several pay telephone housings installed in seat backs of the seats aboard a vehicle such as a commercial aircraft. A passenger uses a seat-mounted phone located in one of the seat backs of the row directly in front of the passenger. When the passenger inserts a credit card into an opening provided in the pay telephone housing for that purpose, a telephone handset is dispensed from a storage trough formed within the housing. The handset is connected to the housing by a retractable cord which is spooled upon a cylindrical cord reel. The cord reel itself is, in a typical construction, mounted off center with respect to the ends of the storage trough so that the cord exits the cord reel tangentially to the circular perimeter of the cord reel, thereafter continuing longitudinally into the storage trough without bending.

Examples of seat-mounted phones as discussed above are shown and described in the following patents and patent applications: U.S. Pat. No. 4,881,254, entitled "Hand-Held Pay Telephone and Holder", to Goeken et al.; U.S. Pat. No. 4,811,387, entitled "Holder and Credit-Card Unlatching Mechanism for a Hand-Held Telephone", to Hollowed et al.; and Ser. No. 288,940, entitled "Holder and Latching Mechanism for a Hand-Held Telephone", filed Dec. 23, 1988 in the name of Jerome L. Oldani.

While seat-mounted phones as referred to and described above and in the above-mentioned patents and patent application meet most passenger requirements, there are some passenger requirements that are not fully satisfied by such phones. In particular, since seat-mounted phone installations are designed specifically for seat backs, passengers seated directly behind the bulkhead do not have a seat-mounted phone available for their use. It would be a benefit, therefore, to provide passengers seated directly behind bulkheads with access to telephones for their own use.

An additional design constraint of the seat-mounted phone results from the fact that the cord must exit the cord reel tangentially to the cord reel's circular perimeter in order to continue longitudinally without bending into the center of one of the storage trough's ends. As a consequence of this design constraint, the seat-mounted phone must have a greater vertical dimension than might be preferred for aircraft applications and is therefore less compact than might be desired given the constraints of space limitations in a commercial aircraft environment. Thus, a more compact telephone pay station for use by mass transit passengers would have value for the bulkhead applications discussed above.

Another design constraint of the seat-mounted phone as described above is that the housing is constructed from two pieces. The two pieces must be formed separately and then welded or otherwise joined together. Clearly, it would be preferable to have a unitary, one-piece housing for the telephone pay station.

Another class of pay telephones intended for mass transit applications is called the "armrest-mounted phone". The armrest-mounted phone is used in a system including several pay telephone housings installed beneath armrests of the seats of a vehicle such as a commercial aircraft. A passenger uses an armrest-mounted phone mounted in either of the two armrests between which the passenger is seated. When the caller inserts a credit card into an opening provided in the pay telephone housing for that purpose, a telephone handset is dispensed from a storage trough formed within the housing. The handset is connected to the dispenser by a retractable cord which is spooled upon a cord reel.

Examples of armrest telephones as discussed above are described and shown in the following U.S. patent applications: Ser. No. 278,391, entitled "Dispenser and Unlatching Mechanism for a Hand-Held Pay Station Telephone", filed Dec. 1, 1988 in the names of Edward J. Hollowed and Jerome L. Oldani; Ser. No. 278,392, entitled "Pay Station Telephone and Dispenser for a Commercial Conveyance", filed Dec. 1, 1988 in the names of Edward J. Hollowed and Jerome L. Oldani; and Ser. No. 278,393, entitled "A Hand-Held Pay Station Telephone Dispenser and Cord Retractor", filed Dec. 1, 1988 in the names of Edward J. Hollowed and Jerome L. Oldani.

While the armrest-mounted phones as referred to and described above and in the aforementioned patent applications meet most passenger requirements, they too have certain design constraints which limit their use in applications contemplated by the present invention.

First, to accommodate the armrest-mounted phone, the armrest to which the phone is to be attached must be enlarged substantially. Second, if the armrest accommodating the armrest-mounted phone is raised to its concealed position between the two seats to which the armrest is attached, for example, to give passengers in adjacent seats greater freedom of movement or to permit a passenger to lie across two or more seats, the phone hardware of the armrest-mounted phone will protrude from between the seats and possibly inconvenience the passengers from the standpoint of comfort. Furthermore, convenient use of an armrest-mounted phone is limited to the two passengers seated adjacent the armrest to which the phone is attached.

SUMMARY OF THE INVENTION

Accordingly, it is an object of the present invention to provide a telephone handset that functions in an aircraft or similar environment without significant signal deterioration due to electromagnetic interference.

It is a further object of the invention to provide telephone pay stations which can be mounted at various locations aboard a mass transit vehicle, such as an aircraft, to enable several passengers to place calls simultaneously without leaving their seats.

It is another object of the invention to provide passengers seated directly behind a bulkhead of a mass transit vehicle with convenient pay telephone service.

It is still another object to provide a telephone pay station of compact size.

It is a further object of the invention to provide a telephone pay station housing of a single piece, thereby simplifying the manufacturing process.

It is another object to provide a telephone pay station of a configuration and design that does not permit loose objects to be rested thereon.

It is a further object to provide a telephone pay station that can be easily installed.

The above and other objects of the invention are attained by a telephone pay station in accordance with the present invention that provides a passenger, including a passenger seated directly behind a bulkhead of a mass transit vehicle, with a convenient means to make telephone calls without leaving his or her seat.

A telephone housing in accordance with the present invention is adapted for mounting on a surface, including a bulkhead of a commercial aircraft. The housing has a longitudinal storage trough defined therein for storing a normally inactive telephone handset. The telephone handset is connected to a cord which is dispensed from a cord reel contained within the housing. The telephone housing also has a slot defined therein. Upon insertion and removal of a predetermined implement, such as a credit card, from the slot, the telephone handset is dispensed from the trough. As the telephone handset is moved away from the housing, the cord reel rotates, thereby unwinding additional cord for use by the caller.

Operation of the telephone dispenser of the present invention provides a number of benefits for its users. First, the telephone pay station housing and the telephone handset are connected by a wire, rather than by a radio link. Therefore, the effect of electromagnetic noise on operation of the handset is sharply reduced. Another benefit, unlike prior arrangements, is that the housing is of a molded, unitary construction. As a result, no welding or other joining of pieces is needed, and the manufacturing process is therefore less expensive and less complex.

Another benefit is the compact size of the housing. In the present invention, the cord reel is centered with respect to the storage trough from which the telephone handset is dispensed so that cord is dispensed from the cord reel in a direction perpendicular thereto. Consequently, the housing is smaller than would be required if the cord were to exit the cord reel in a direction tangential thereto.

Another benefit results from constructing the housing so that it has smooth, gently rounded edges that will not unduly interfere with passengers, their clothing or possessions. As a further design feature, the sides and ends of the housing are tapered to discourage passengers from placing objects such as pens and drinks on the housing. The likelihood of these objects being tossed about after being placed upon the housing is thereby substantially diminished if not eliminated entirely.

Another benefit of the housing is the simplified installation afforded by the present invention. A number of easily removable "punch-out" regions are provided in the housing, by which a wire from remotely located central telephone equipment can be routed to interior parts of the housing from a number of different directions. Furthermore, the cord reel is mounted to the housing before installation of the telephone dispenser, so that the housing and cord reel can be installed in a single operation.

BRIEF DESCRIPTION OF THE DRAWINGS

FIG. 3 is a bottom plan view of the telephone handset housing of the present invention, with base plate removed.

FIG. 4 is a perspective view of the cord reel assembly and several other proximately located components of the present invention.

FIG. 5 is an orthogonal side view of the cord guide of the present invention.

FIG. 6 is a perspective view of the cord guide of the present invention.

FIG. 8 is an enlarged bottom plan view of a portion of the telephone handset housing of the present invention.

DESCRIPTION OF THE PREFERRED EMBODIMENT

Figure 1:
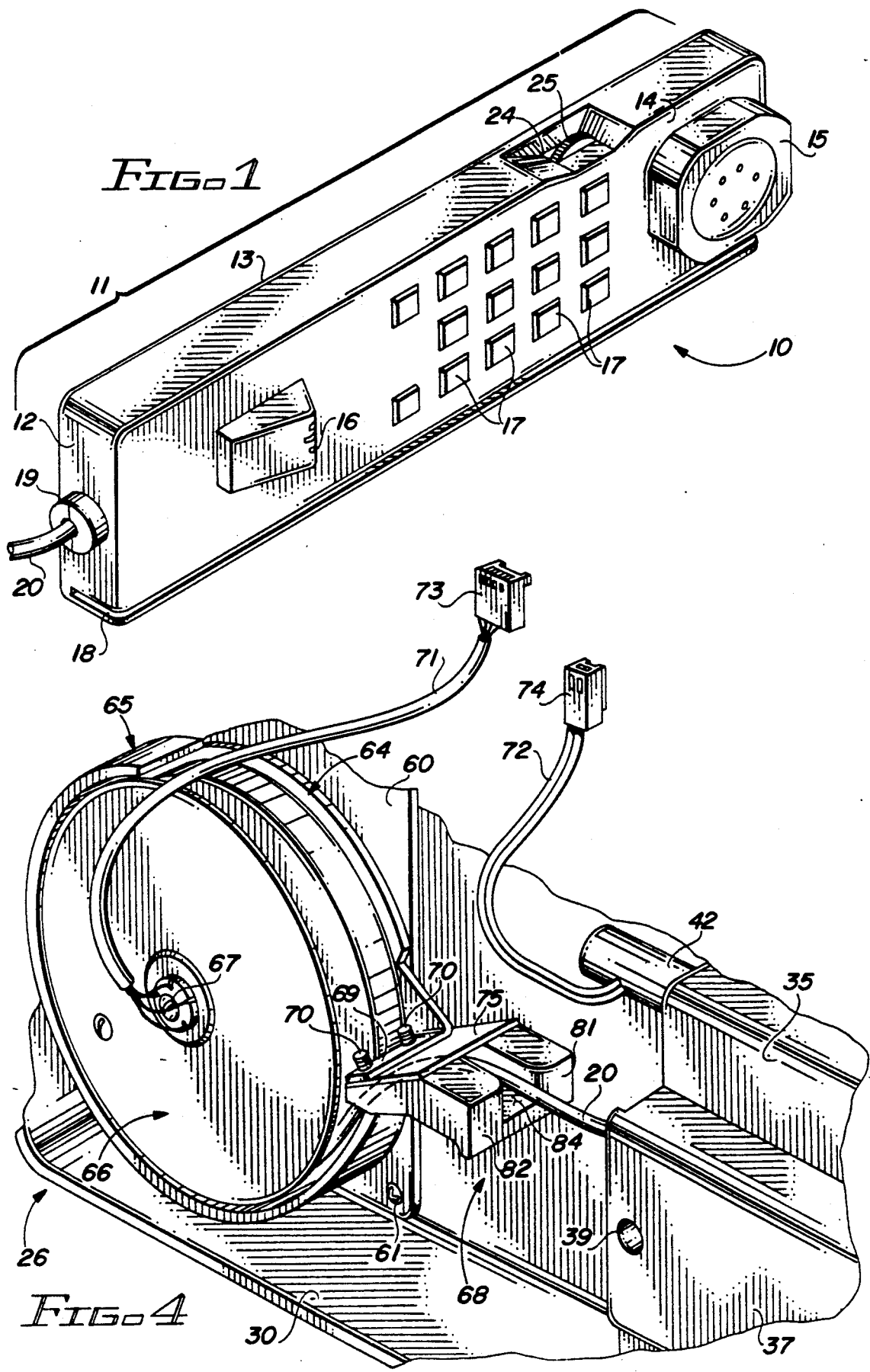
FIG. 1 is a perspective view of a telephone handset used by the present invention.

Referring now to the drawings, a preferred embodiment of the invention will be described. The invention provides a compact telephone pay station especially suited for use aboard mass transit vehicles. The principal components of the pay station include a telephone handset 10, shown most clearly in FIGS. 1 and 2, a telephone handset housing 26, shown most clearly in FIGS. 2 and 3; a cord reel assembly 66, shown most clearly in FIGS. 3 and 4; and a latching mechanism 96, shown most clearly in FIGS. 7 and 8.

Referring now to FIG. 1, the telephone handset 10 will be described. The fundamental component of the telephone handset 10 is an elongate body 11. The body 11 has a first end 12, a first side 13, and a first face 14. Although not visible in FIG. 1, the body 11 also includes a second end 21 (shown in FIG. 2), a second side, and a second face opposing and parallel to the first end 12, the first side 13, and the first face 14, respectively, thereby collectively forming a generally rectangular, box-like configuration for the body 11. A speaker 15 and a microphone 16 protrude from and are formed on the first face 14. In addition, a plurality of keys 17 are provided on the face 14 to enable a user to operate the handset 10. A long narrow groove 18 is provided within the body 11 for slidably receiving a credit card as part of the operation of the handset 10.

The handset 10 further includes a collar 19 connected to the first end 12 of the body 11. A cord 20 passes through the collar 19 and is electrically attached to a handset circuit, not shown, located inside the body 11. The handset circuit performs standard telecommunications functions as are readily understood by those having ordinary skill in the art of telephony.

Figures 2, 7:
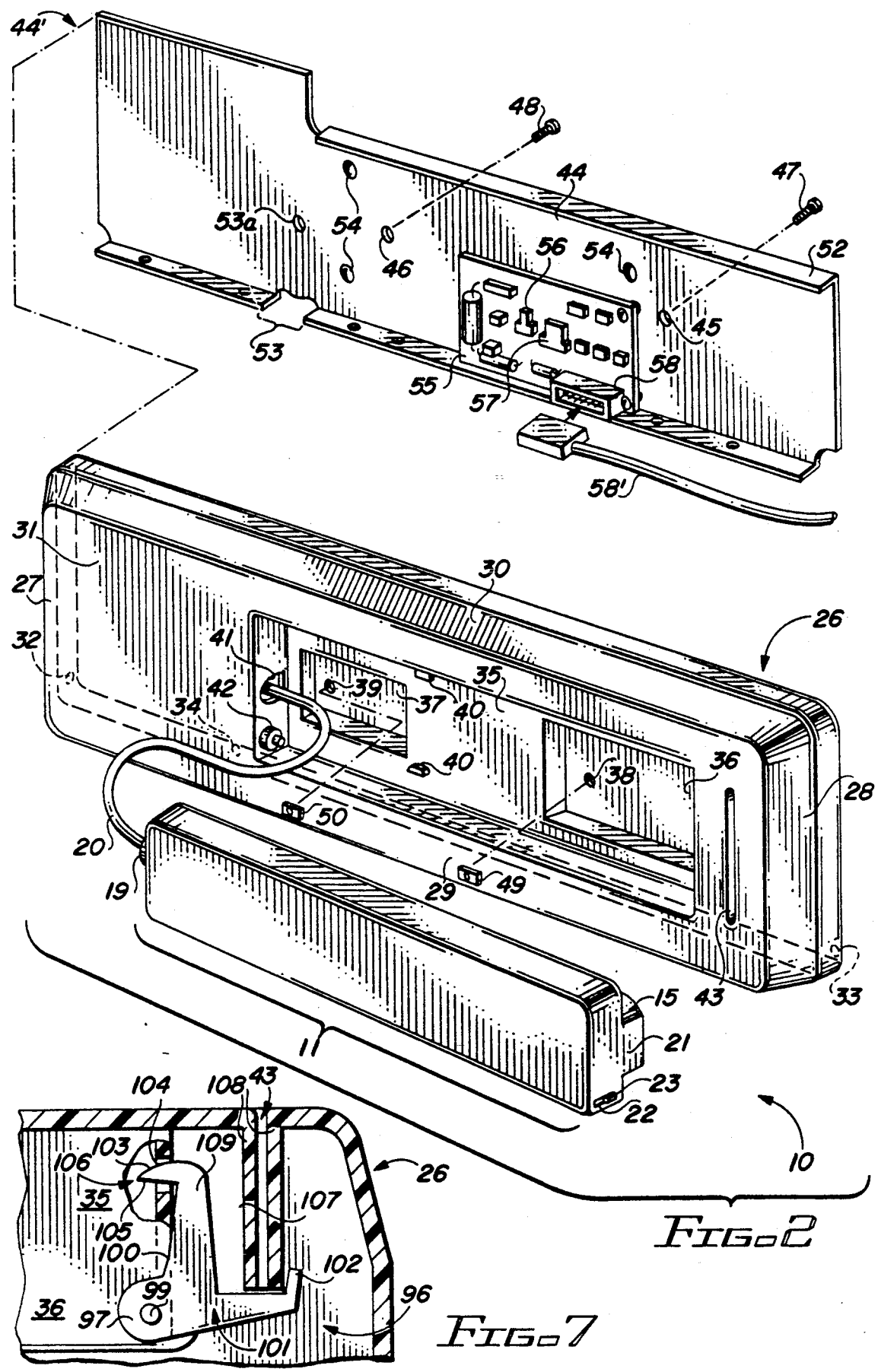
FIG. 2 is an exploded perspective view of a telephone handset and the associated housing of the present invention.
FIG. 7 is a cut-away orthogonal side view of the latching mechanism of the present invention, from the line 7—7.

FIG. 2 shows a number of additional features of the handset 10. In particular, a latching notch 22, the purposes of which will be described hereinafter, is defined in the end 21 of handset body 11. Additionally, a rounded protruding catch 23, the purposes of which will be described hereinafter, is formed on the end 21 of handset body 11.

Also shown in FIG. 2 is the relationship of the handset 10 to the telephone handset housing 26 with which the handset 10 is used. The housing 26 is a generally elongate box-like unit, formed by a first end 27, a second end 28, a first side 29, a second side 30, and a front face 31. As indicated in FIG. 2, the first end 27, second end 28, first side 29, and second side 30 are tapered in the direction of the front face 31. Furthermore, the corners and edges formed by the intersections between the end 27, end 28, side 29, side 30, and front face 31 are rounded. The purpose of the tapers and the rounded corners and edges is to prevent the housing 26 from interfering with passengers and their clothing and belongings, and to prevent loose objects from being rested on the housing 26.

The first end 27 of the housing 26 further has a "punch-out" region 32 defined therein by perforating or making the region 32 thinner than the rest of the end 27. Similarly, the second end 28 and the first side 29 have "punch-out" regions 33 and 34, respectively, defined therein. Thus, by "punching out" or otherwise removing one of regions 32, 33, or 34, an opening can be produced for routing of a wire 58' used to electrically attach the telephone dispenser to remotely located central telephone equipment (not shown).

The front face 31 of the housing 26 as shown in FIG. 2 has a slot 43 defined therein at one end. The slot 43 is positioned parallel to and adjacent to the second end 28 and is defined within the housing 26 by an oblong receptacle 108, shown in FIGS. 3, 7, and 8, and to be described more fully hereinafter. Also defined within the front face 31 is a longitudinal storage trough 35 for receiving the handset 10. The trough 35 is generally rectangular, so as to provide a receptacle for receiving and retaining the handset 10 in snug relationship.

The trough 35 has several additional features. In particular, two resilient compressive buttons 40, the purpose of which will be explained hereinafter, are connected to trough 35. Buttons 40 are tightly maintained within holes (not shown) defined in the housing 26, from which the buttons 40 protrude. In addition, a speaker cup 36 is defined in the trough 35 for receiving the speaker 15 of the telephone handset 10. A microphone cup 37 is also formed in the trough 35 for receiving the microphone 16 of the telephone handset 10. The speaker cup 36 and the microphone cup 37 have holes 38 and 39 formed therein, for purposes as will be explained hereinafter. The trough 35 has a latching slot 106 defined therein, shown in FIG. 7, to be described in greater detail hereinafter. Furthermore, an aperture 41 defined in the trough 35 permits the cord 20 to pass through. A switch 42 is provided at one end of the trough 35 adjacent to the aperture 41 and is arranged to be triggered upon insertion of the handset 10 into the trough 35, as will be more fully explained hereinafter.

A mounting apparatus 44' for the housing 26 as described is also shown in FIG. 2. The mounting apparatus 44' includes a generally rectangular base plate 44 made from aluminum or other suitably lightweight, durable material. The base plate 44 has a pair of anchor nuts 45 and 46 formed therein in alignment with the holes 38 and 39 in the handset housing 26. Two bolts, not shown, are passed through the holes 38 and 39 and threaded into the corresponding nuts 45 and 46, thereby attaching the base plate 44 to the housing 26.

The base plate 44 further includes flanges 51 and 52 at the opposing longitudinal edges of the base plate 44. The flange 51 has a notch 53 defined therein which, when the base plate 44 is secured to the housing 26, is adjacent to the punched-out region 34, thereby allowing the wire 58' to pass through. Alternatively, the wire 58' is permitted to exit the housing 26 through a hole 53a defined in the base plate 44. An additional feature of the base plate 44 includes one or more mounting holes 54 defined therein, through which mounting bolts, not shown, can be passed for the purpose of mounting the housing 26 to a surface such as a bulkhead of a commercial aircraft.

The mounting apparatus 44' as shown in FIG. 2 further includes a housing circuit 55. The housing circuit 55 is used in conjunction with the remotely located central communications circuitry and the handset circuit included in the handset 10 to control the electronic functions of the telephone dispenser. First, second, and third connectors 56, 57, and 58, respectively, are mounted on the housing circuit 55. The wire 58' from the remotely located central communications circuitry can be electrically attached to the housing circuit 55 by the third connector 58. The purpose of the connectors 56 and 57 will be explained more fully hereinafter.

Referring now to FIGS. 3 and 4, the rear view of the housing 26 and the equipment connected thereto are shown and will now be described. A rectangular plate 60 is mounted to the housing 26 by fastening devices 61. A thin circular plate 64 is mounted to the plate 60 by one or more suitable fasteners such as screws (not shown). Additionally, a railing 65 is connected to the circumferential area of the plate 64, in a direction perpendicular thereto, and generally forms a partial cylinder extending perpendicularly from the plate 64. A spool-shaped cord reel 66 is mounted on the plate 64 by a central bolt 67 which passes through a cylindrical channel (not shown) of the cord reel 66. The cord reel 66 rotates about the bolt 67. Any cord 20 that is unused is wound upon the cord reel 66. The cord reel 66 is spring-loaded with respect to the bolt 67 so that it is biased to rotate in a direction that is clockwise with reference to the arrangement shown in FIGS. 3 and 4. Furthermore, the spring loading of the cord reel 66 maintains a constant tension on the cord 20 so that the cord 20 does not accumulate slack. Because the cord reel 66 is closely sheathed inside the railing 65, as described above, the railing 65 serves to protect the rotation of the cord reel 66 and insures that the cord 20 is properly wound thereon.

Referring now to FIGS. 3 through 6, the cord reel 66 and related assembly will be discussed in greater detail. As shown most clearly in FIG. 4, a projection 69 extends from the plate 64 in a generally perpendicular direction and is adapted to be secured to a cord guide 68. A cord guide cover 75 of generally rectangular shape has two holes 91 defined therein, as shown most clearly in FIG. 6, and is placed against the projection 69 so the that holes 91 are aligned with holes (not shown) provided in the projection 69. The cord guide 68 has two holes 90 defined therein, as shown most clearly in FIG. 5, and is placed directly against the cord guide cover 75. Furthermore, a pair of screws 70, most clearly shown in FIGS. 4 and 5, secure the cord guide 68 and the cord guide cover 75 against the projection 69. The cord guide cover 75 can be formed from plastic or other suitable, durable, lightweight, non-abrasive material. Therefore, the cord guide cover 75 acts to prevent abrasion between the cord 20 and the projection 69.

The purpose of the cord guide 68 is to direct the cord 20 to and from the cord reel 66 in a direction perpendicular to the circumference thereof. From the cord guide 68, the cord 20 passes through the aperture 41 (shown most clearly in FIG. 2) in the handset housing 26 into the trough 35 of the housing 26. As mentioned above, the cord 20 is electrically attached to a handset circuit, not shown, inside the telephone handset 10.

To establish necessary electrical connections, a first wire 71 (shown in FIG. 4) is electrically attached to the cord 20 via the cord reel 66, and a second wire 72 is electrically attached to the switch 42. The first wire 71 is electrically attached to a cord connector 73 and the second wire 72 is electrically attached to a switch connector 74. The cord connector 73 is electrically attached to the connector 57, shown in FIG. 2, of the mounting assembly 44', thereby electrically attaching the cord 20 to the housing circuit 55. Similarly, the switch connector 74 is electrically attached to the connector 56, shown in FIG. 2, of the mounting assembly 44', thereby electrically attaching the switch 42 of the handset housing 26 to the housing circuit 55.

Referring further to FIGS. 4, 5, and 6, the cord guide 68 will be described in greater detail. The cord guide 68 comprises a first section 81 and a second section 82 connected by a cross-member 83, shown in FIG. 5. The sections 81 and 82 are generally parallel to each other, with their inward sides defining a grooved channel 84. A reinforcing rib 85 is formed on an end of sections 81 and 82 and an end of the cross-member 83 in order to maintain the sections 81 and 82 in a perpendicular orientation to the cross-member 83.

As best shown in FIGS. 5 and 6, section 82 of the cord guide 68 includes first and second rectangular areas 86 and 88 and a triangular area 87 interposed between the first and second rectangular areas 86 and 88. As in the case of the section 82, the section 81 also has rectangular areas separated by a triangular area. Because of the separation of the rectangular areas of the cord guide 68 by the triangular areas, the cord guide 68 has portions at acute angles so that the cord is deflected through the cord guide in a non-linear fashion, as shown in FIGS. 4 and 5.

As previously mentioned, sections 81 and 82 each have a longitudinal hole 90 defined therein for receiving a fastener, such as one of the screws 70. The cord guide cover 75 is located adjacent to the cord guide 68, and the cover 75 and the cord guide 68 are fastened to the projection 69 of the plate 64 by the screws 70. The screws 70 reside within the holes 91 of the cord guide cover 75, the holes 90 of the cord guide 68, and the holes (not shown) in the projection 69.

For explanatory purposes, the cord guide 68 is shown as being constructed of solid material. It will be readily apparent to one having ordinary skill in the art that the cord guide 68 can be lightened, without significantly sacrificing strength, by hollowing the sections 81 and 82.

The telephone handset 10 as described above is latched to the handset housing 26 by a latching mechanism 96 as best shown in FIG. 3 and also, in greater detail, in FIGS. 7 and 8. As particularly shown in FIGS. 3 and 8, the latching mechanism 96 is attached to the speaker cup 36 of the housing 26.

Referring to FIGS. 7 and 8, the latching mechanism 96 will be described in greater detail. As shown in FIGS. 7 and 8, the latching mechanism 96 is an integral member having two arms 97. Each arm 97 has an eyelet 98 defined therein. A pair of cylindrical pivot pins 99 are formed upon opposite walls of the speaker cup 36 for attaching the latching mechanism 96 thereto. The pivot pins 99 and the eyelets 98 are of suitable dimension so that the pivot pins 99 can be inserted into the eyelets 98. The latching mechanism 96 is thus attached to the housing 26 and permitted to rotate about the pivot pins 99.

The latching mechanism 96 further includes a latch release plate 100 which extends away from an upper-arm portion 109. A credit card engaging member 101 is attached to and extends between the arms 97. A spring 107 presses the latch plate 100 toward the trough 35. Similarly, the spring 107 presses the engaging member 101 toward the receptacle 108. A credit card blocking element 102 is formed integrally with the credit card engaging member 101 at one end thereof and extends perpendicularly from the engaging member 101. The blocking member 102 prevents slippage of a credit card against the engaging member 101 as the credit card is inserted into the slot 43 of the receptacle 108 during removal of the handset 10 from the handset housing 26.

The latching mechanism 96 additionally includes a latching finger 103. The latching finger 103 is connected to the latch release plate 100, and extends through a latching slot 106 of the speaker cup 36. The latching finger 103 has a rounded handset extracting surface 104 and a flat handset retaining surface 105. The latching mechanism 96 as described above is described in greater detail in Ser. No. 288,940, entitled "Holder and Latching Mechanism for a Hand-Held Telephone", filed Dec. 23, 1988, in the name of Jerome L. Oldani. The disclosure of that application is incorporated herein by reference.

Having now described the structure of the present invention, the operation of the present invention will now be described. In particular, referring to FIGS. 1, 2, 7 and 8, the condition will be described in which the handset 10 is stored in the handset housing 26. When the handset 10 is inactive, it is stored in the trough 35 of the housing 26. In this position, the collar 19 resides within the aperture 41 in the housing 26, thereby retaining the first end 12 of the handset 10 within the trough 35.

The second end 21 of the handset 10, shown in FIG. 2, is secured within the trough 35 by the retaining surface 105 of the latching finger 103 in conjunction with the latching notch 22 and the rounded protruding catch 23. The retaining surface 105 extends through the latching slot 106 of the speaker cup 36, into the latching notch 22. The retaining surface 105 abuts against the protruding catch 23, thereby retaining the second end 21 of the handset 10 firmly within the trough 35. In this position, the spring 107 is not compressed, the latching plate 100 is adjacent to the speaker cup 36, and the credit card engaging member 101 is adjacent to the receptacle 108.

With the first and second ends 12 and 21 of the handset 10 retained within the trough 35, the compressive resilient buttons 40 are compressed between the face 14 of the handset 10 and the trough 35, thereby exerting a force on the handset 10, in an outward direction from the trough 35, so that the handset 10 can be urged from the trough 35 when the latching mechanism 96 disengages from the handset 10.

Referring again to FIG. 3, the condition of the inactive handset 10 stored within housing 26 will be further apparent. A constant tension is maintained on the cord 20 by the spring-loaded cord reel 66. Nearly all of the cord 20 is snugly wound upon the cord reel 66. In addition, the switch 42 is triggered, due to the presence of the handset 10 in the trough 35.

The process of releasing the handset 10 from the trough 3 can best be understood by referring to FIGS. 2, 7 and 8. The first action needed to release the handset 10 from the trough 35 is the insertion of a predetermined implement, such as a credit card, into the slot 43 of the handset housing 26. Once the credit card is initially inserted into the slot 43 and through the receptacle 108, contact is made with the credit card engaging member 101. Upon further insertion of the credit card into the receptacle 108 the credit card contacts the blocking surface 102, and the engaging member 101 is moved away from the receptacle 108 as the latching mechanism 96 is caused to pivot about the pivot pins 99. As a result, the spring 107 is caused to be compressed and the latch release plate 100 moves away from the speaker cup 36. In addition, as the latching mechanism 96 pivots about the pivot pins 99, the latching finger 103 exits the latching slot 106, disengages from the catch 23, and thus releases the handset 10. Rotation of the latching mechanism continues until the upper-arm portions 109 meet the receptacle 108.

The process of expelling the handset 10 from the trough 35 can best be understood by referring to FIGS. 2, 7, and 8. Once the latching finger 103 has disengaged from the protruding catch 23, thereby releasing the handset 10, the compressive resilient buttons 40 urge the handset 10 out of the trough 35. Removal of the credit card from the receptacle 108 causes the latching finger 103 to re-enter the latching slot 106. Upon further entry of the latching finger 103 into the trough 35, the rounded handset extracting surface 104 of the latching finger 103 contacts the rounded protruding catch 23, thereby cooperating with the buttons 40 in urging the handset 10 further from the trough 35. Subsequent displacement of the handset 10 from the housing 2 is manually performed by the user. The user grips the second end 21 of the handset 10 and removes the handset 10 from the trough 35. After continued withdrawal of the second end 21 of the handset 10, the collar 19 is disengaged from the aperture 41. Thus, the handset 10 is entirely removed from the housing 26. Upon removal of the handset 10 in this manner, the switch 42 is restored to its non-triggered state.

A number of other events occur upon displacement of the handset 10 from the housing 26. The tension on the cord 20 from removal of the handset 10 causes the cord 20 to be pulled from the cord reel 66, thereby rotating the cord reel 66. The close fit between the plate 64, the railing 65, and the cord reel 66 shields the cord reel 66 so that the cord 20 is maintained on the cord reel 66 for proper unwinding of the cord 20. Since the cord reel 68 is spring-loaded, a constant tension is maintained on the cord 20 throughout displacement of the handset 10 from the housing 26.

The operation of the cord guide 68 during displacement of the handset 10 from the housing 26 is best understood with reference to FIGS. 4, 5 and 6. The cord 20 from the cord reel 66 enters the cord guide 68 between sections 81 and 82, and is routed through the cord guide 68 by way of the grooved channel 84. Therefore, the cord 20 is caused by the grooved channel 84 to exit the cord guide 68 in a direction perpendicular to the circumference of the cord reel 66. Furthermore, the cord 20 passes directly from the cord guide 68 into the aperture 41 in the housing 26, in a direction parallel to the first and second sides 29 and 30 of the housing 26.

From the above discussion, it will be readily apparent that the present invention provides a number of advantages over the prior art. Since the handset 10 is wired to the housing circuit 55 and other central communications circuitry, the handset 10 functions without signal deterioration due to electromagnetic interference. Another advantage is the compact size of the invention. The cord guide 68 permits the cord 20 to be wound and unwound from the cord reel 66 in a direction perpendicular to the circumference thereof. The configuration and arrangement of the cord reel 66 and the related components allows the cord reel 66 to be centered with respect to the longitudinal storage trough 35, effectively decreasing the size required for the housing 26. These features, and the compact size of the present invention, enable passengers aboard a mass transit vehicle to have convenient, simultaneous telephone service.

Other advantages are the provision of the removable "punch-out" regions 32, 33, and 34, and the attachment of the cord reel 66 to the telephone handset housing 26, which allow the housing 26 to be easily installed. In addition, the mounting apparatus 44' permits the housing 26 to be easily mounted on a surface such as the bulkhead of a commercial airplane.

Another advantage is that the second side 30 of the housing 26 is tapered in a direction toward the front face 31 of the housing 26, thereby preventing objects from being placed and retained thereon, when the housing 26 is mounted on a vertical surface. In addition, the corners formed by the intersections between the first and second sides 29 and 30, the first and second ends 27 and 28, and the front face 31 are rounded to minimize interference with passengers and their belongings.

While there have been shown what is at present considered to be preferred embodiment of the invention, it will be apparent to those skilled in the art that various changes and modifications can be made herein without departing from the scope of the invention as defined by the appended claims.

I claim:

1. A telephone handset dispenser, comprising:
a housing having:

a front face with a trough defined therein for storing a telephone handset;

means for mounting the housing onto a mounting surface;

a cord reel rotatably attached within the housing and centered with respect to an end of the trough, said cord reel being operative during use of the handset to dispense a length of cord secured to both the cord reel and the handset; and a cord guide comprising:

a cross-member bent at a region oriented longitudinally to said cross-member for creating a first side bent an acute angle and a second side bent at an obtuse angle;

a first section formed upon the second side of the cross-member along a first end thereof, said first section being generally perpendicular to the longitudinal region; and a second section, formed upon the second side of the cross-member along a second end thereof, the second end opposing the first end, the second section being generally perpendicular to the longitudinal region, said second section being separated from the first section, the first section and said second section and the cross-member thereby cooperating to define a grooved channel.

2. The telephone handset dispenser recited in claim 1, wherein the cord guide further comprises:

a third end defined on the cross-member, the third end being generally perpendicular to the first and second ends; and a reinforcing rib formed upon the first side proximate to the third end for maintaining the rigidity of the cross-member in a direction perpendicular to the rib.

3. The telephone handset dispenser as recited in claim 1, wherein the first and second sides have one or more holes defined therein for receiving one or more fastening devices for mounting the cord guide to the housing.

4. The telephone handset dispenser recited in claim 1, wherein the first and second sections are generally hollow.

5. The telephone handset dispenser recited in claim 1, wherein the cord guide is formed from a plastic material.

* * * * *